United States Patent [19]

Baleshta et al.

[11] Patent Number: 4,597,005
[45] Date of Patent: Jun. 24, 1986

[54] DIGITAL COLOR PHOTOGRAPHIC IMAGE VIDEO DISPLAY SYSTEM

[75] Inventors: Theodore Baleshta, Ontario; Seymour Shlien, Ottawa; Brian Harron, Ontario, all of Canada; Kei Takikawa, Yokohama, Japan

[73] Assignee: Canadian Patents and Development Limited, Ottawa, Canada

[21] Appl. No.: 603,931

[22] Filed: Apr. 26, 1984

[51] Int. Cl.$^4$ .................... H04N 11/02; H04N 11/06
[52] U.S. Cl. ........................................ 358/12; 358/11; 358/15; 358/133; 358/142; 358/147
[58] Field of Search ................ 358/11, 12, 13, 14, 358/15, 16, 133, 138, 142, 146, 147

[56] References Cited

U.S. PATENT DOCUMENTS 4,516,151  5/1985  Stahler .................................. 358/12

Primary Examiner—Michael A. Masinick
Attorney, Agent, or Firm—Wegner & Bretschneider

[57] ABSTRACT

In a color photographic video data conversion system digital data representing each of three primary color components of a pixel is converted (i.e. encoded) to digital data comprising luminance data for the pixel and smoothed (i.e. averaged) chrominance data for a group of contiguous pixels, thereby reducing for transmission the amount of data required to represent picture information. Chrominance data for a group of four pixels in a two-by-two array is selected for smoothing, the human eye being about one quarter as sensitive to color as brightness. When the digital video data is received, the luminance and chrominance data is converted (i.e. decoded) to primary color data comprising data representing satisfactorily each of three primary color components for a pixel. The method of, and apparatus for, both encoding and decoding data in the data conversion system is provided.

16 Claims, 7 Drawing Figures

VIDEO DISPLAY RASTER ILLUSTRATING
DIGITAL REPRESENTATION OF ONE
PIXEL OF A SCREEN RASTER

VIDEO DISPLAY RASTER ILLUSTRATING DIGITAL REPRESENTATION OF ONE PIXEL OF A SCREEN RASTER

FLOW CHART—
COMPRESSION METHOD FOR
DIGITAL CHROMINANCE DATA

CONVERSION SYSTEM FOR DIGITAL PHOTOGRAPHIC COLOUR VIDEO DATA

BLOCK DIAGRAM SHOWING PROCESS
OF ENCODING VIDEO IMAGE INFORMATION

BLOCK DIAGRAM SHOWING DECODING PROCESS TO DECODE VIDEO IMAGE INFORMATION

YUV-RGB CONVERTER

RASTER ADDRESS &
SYNC GENERATOR

DIGITAL COLOR PHOTOGRAPHIC IMAGE VIDEO DISPLAY SYSTEM

FIELD OF THE INVENTION

This invention relates to a digital videotex communications system and more particularly to a method and apparatus for encoding and decoding digital colour photographic image data for video display.

BACKGROUND OF THE INVENTION

Information videotex systems, such as that developed by the Department of Communications, Canada, known as Telidon* (*a trade mark for which notice has been given under Section 9(1)(n)(iii) of the Canadian Trade Marks Act by the Ministry of Communications of the Federal Government of Canada), have been developed to provide videotex information to subscribing consumers which can be displayed on an ordinary television set or a video display terminal adapted for such purpose. Such information might include, for example, weather, news stories, travel information, and entertainment.

The Telidon* system defines a set of digitally represented codewords and syntax for those codewords creating a specialized information language which, in turn, is used to communicate to a subscriber a variety of information types. A receiver receives the videotex information, decodes it and displays it on an appropriate video display screen. Examples of information types are graphics, text, and images. Various information types may be combined to produce one display "page" of information.

A variety of communications links might be chosen to transmit videotex information. For example, a communications channel might be selected from television broadcast or cable channels, or an optical fiber link might be chosen. If a standard (occupied) television broadcast channel is elected, the videotex information is incorporated into the broadcast frequency channel in such a manner that it does not interfere with or affect in any way, the reception of the standard television signal. At the receiver, a decoder is necessary to decode the Telidon* videotex information and display it on a video screen. For any given selected mode of transmission, the decoder identifies received videotex information signals (and distinguishes them from other signals which might be received with the videotex data signals) and interprets and displays the information on a video screen.

A standard for Telidon* known as North American Presentation Level Protocol Standard (NAPLPS) has been adopted by the Canadian Standards Association (CSA) and American National Standards Institute (ANSI). This standard assumes serially transmitted data (i.e. discrete binary digits of digital codewords are sequentially transmitted from, and received on, the same two-wire pair or fiber) and defines for each digital codeword one or more meanings, the specific meaning depending upon accompanying codewords (i.e. the syntax within which the codeword appears). One or more predetermined codewords are control codewords which provide information regarding the type of immediately following information. For example, where graphics occur, the control codeword for graphics (i.e. Picture Description Information—PDI) precedes the start of graphics data so that the codewords following the control codeword are interpreted in accordance with the particular control codeword. Therefore, if the control codeword for graphics occurs, the codewords following the control codeword are interpreted according to a codeword subset for graphics. Any given non-control codeword might fall under a variety of codeword subsets, the specific subset applicable being determined by a control codeword. Graphics and video images are two information types which may be provided in the Telidon* system and for which a control codeword has been defined, each information sequence associated with either control codeword providing pictorial information describing a defined area on a video display screen.

When it is desired to deal with discrete packets of information (i.e. digital format comprising, for example, bytes of data) describing a video display picture, for reception and display by a video display terminal, it is convenient to divide the area of the video display terminal screen into a number of discrete smaller areas, known as pixels, combining to form an array of pixels, known as a video raster. Each pixel can have assigned to it discrete visual data and so, the greater the number of pixels chosen for the screen raster, the greater will be the picture resolution capacity of the selected display screen. To illustrate this, consider, for example, that if a circle is displayed using only a small number of large-area pixels of square or rectangular shape, the intended circular shape would not appear to result from any arrangement of the pixels chosen to construct a circle. However, if a large number of very small pixel areas are elected, the smaller square or rectangular areas are able to track the curvature of the circle more closely to give the visual appearance of a curved line, forming a circle. Telidon* standards for photographic image information define a pixel resolution of 256 horizontal by 192 vertical. That is, 49,152 pixels (i.e. discrete picture grid areas) together comprise the screen area used to display videotex information in the Telidon* system.

Graphic information is defined by a number of descriptive codewords: For example, a sequence of graphic codewords might follow a graphic control codeword to indicate that a "rectangle" is required; the rectangle is to comprise 50 pixels in width and 40 pixels in height; the top left-hand corner of the rectangle is to begin at pixel location 100,25 (i.e. the 100th pixel in the 25th row of the screen raster); and the rectangle is to be in the colour blue. Pictorial graphic displays are, in effect, a combination of defined shapes of various sizes, colours and positions. This method of coding graphic images is frequency bandwidth efficient and/or time efficient for transmission purposes because a relatively small number of codewords is required to represent pictorial information for a substantial number of pixels i.e. information representing a large picture area. This is so because graphic information is transmitted in a general descriptive format rather than in a point-to-point (i.e. pixel-by-pixel) format.

Photographic image capability is provided by the Telidon* system and is an information type included in the NAPLPS standard for videotex information systems. Instead of generally describing pictorial information, as in the case of graphic information, information is transmitted for each pixel of the display screen (i.e. for each of the 49,152 pixels) in a pixel-by-pixel format. Digital pixel-by-pixel image information is commonly provided, for example, by a real-time video camera. Since every colour can be represented to an acceptable degree of visual satisfaction by a specific combination of, for example, the three primary colours, red, green and blue, a colour image may be defined, on a pixel-by-pixel basis by the relative primary colour components of the discrete image area associated with each pixel. Photographic image videotex systems have been developed which transmit three codewords for each pixel, each codeword representing the relative primary colour component for one of three primary colours. Consequently, those systems require transmission of three codewords for each pixel, i.e. 3×256×192 codewords (equal to 147,456 codewords), for every photographic image provided by the videotex system.

The disadvantage of such systems is the large frequency bandwidth required to transmit and receive a large number of image codewords within a preferred short time interval. Given any specific number of codewords to be transmitted, the trade-off is always increased frequency bandwidth in exchange for decreased transmission time or decreased frequency bandwidth in exchange for increased transmission time. Neither increased frequency bandwidth nor increased transmission time is desirable for the purpose of videotex information systems. Frequency bandwidth, in a global sense, is a limited resource and, in a more practical sense, normally involves more expensive equipment the greater the bandwidth desired. Increased transmission time implies longer waiting periods to display videotex "pages", which in turn may result in user dissatisfaction with the videotex information service and fewer subscriptions to the service. Accordingly, it is desirable to reduce the number of codewords representing a photographic video display image in order to reduce the frequency bandwidth and/or time required to transmit the videotex data (i.e. the image information).

DEFINITIONS

Before providing a summary of the invention it will be helpful, to ensure consistency, to define some of the terminology employed in the disclosure and claims.

1. A "bit" is a binary digit and has one of two discrete values. For example, a bit may be either "0" or "1". A data signal may be assigned one of the two values depending upon, for example, the magnitude of the signal (e.g. a signal of <0.8 Volts could be assigned the value 0 and a signal of >2.0 Volts could be assigned the value 1). Such data signal is a data bit represented digitally, in electrical form.

2. A "data packet" is a sequence of a fixed number of bits. Conveniently and widely adopted, the number of bits selected may be 8, forming an 8 bit data packet known as a "byte". A "data byte" can represent any number from 0 to 255 by using base 2 arithmetic. That is, the 8 bit number 10101010 represents the sequence $1\times2^7+0\times2^6+1\times2^5+0\times2^4+1\times2^3+0\times2^2+1\times2^1+0\times2^0$ (equivalent to the decimal number 170) each bit being the coefficient 0 or 1 of a number $2^X$, where X is any integer. (To compare with the decimal representation of a number, one might consider the decimal number 170 which represents the sequence $1\times10^2 30 7\times10^1+0\times10^0$ each coefficient being a number from 0 to 9 since base 10 is used.) A word of caution is in order: the word "packet" when used in this specification has the meaning defined above and does not mean a series of 33 data bytes as used in the Telidon* system.

3. A "pixel", as previously mentioned, is a picture area element being one of an array of such elements which, constitutes a small image display area of a video display (or television) screen. A "raster of pixels" is an array, or grid, of pixels comprising the complete image display area of a video display (or television) screen.

4. A microprocessor is a data processing device which operates digitally, comprising an integrated circuit capable of executing a combination of fixed logic and/or arithmetic operations according to a selected set of instructions. Operations may typically be conducted on 8 bits or 16 bits at a time, depending upon the microprocessor selected. The timing of logic operations executed by a microprocessor is dependent upon, inter alia, the frequency of the clock oscillator (i.e. the clock rate) driving the microprocessor and the internal architecture of the microprocessor. A number of data lines and address lines provide access means to communicate with the microprocessor.

5. Microprocessor data lines (which are parallel) provide communication between the microprocessor and devices on the data line bus such as an operating system in ROM (Read Only Memory), Input/Output Ports and working memory (e.g. Random Access Memory (RAM)).

6. Microprocessor address lines (which are parallel) identify the bus location to which the data (on the data lines) is directed. If there are, for example, 16 address lines, $2^{16}-1$ discrete locations on the data bus can be accessed by the microprocessor (i.e. the numerical range available from 16 bits, including zero). The well-known term "memory mapping" refers to the arrangement of devices wired to address lines so as to correspond to a particular address (i.e. location) to the microprocessor. For example, assuming a microprocessor having 16 address lines, if a ROM is wired to the address lines of the microprocessor in such a way that for any address between 0000000000000000 and 0100000000000000 (i.e. for addresses of which the 15th line, representing the digit coefficient for $2^{14}$, is electrically "low", i.e. a logic 0) the ROM is "on" but "off" for all others, the memory mapping of the ROM to the microprocessor is 0 to 16,383 (i.e. 16K). That is each of the addresses 0 to 16,383 (i.e. 0 to $2^{14}-1$) correspond to discrete memory locations in the ROM circuit device.

SUMMARY OF THE INVENTION

It has been found by the inventors that the number of codewords (i.e. data bytes) required to represent a colour photographic image picture for display on a video screen, on a pixel-by-pixel basis, can be reduced by one-half at least without noticeably impairing perceived image picture quality. This is achieved by effectively increasing the selected area of a discrete video screen area represented by distinct chrominance information. That is, in accordance with the invention, a discrete codeword comprising chrominance information is let to represent more than one pixel. Luminance information, on the other hand, is represented by a discrete codeword for each pixel. The disclosed data conversion system according to the invention, incorporating this method of data reduction, is summarized in the following.

Before transmission an encoder encodes digital colour photographic image data. Colour picture information comprising red, green and blue data packets for each pixel of a raster of pixels is transformed in a defined manner (e.g. by an RGB to YUV linear transformation) into corresponding luminance (e.g. Y) and chrominance (e.g. U, V) data packets. Selected chrominance information represented by data packets (e.g. U, V) corresponding to each pixel in a group of contiguous pixels of a raster of pixels is averaged, i.e. "smoothed", to produce chrominance data packets (e.g. U, V) whereby each packet represents and is thereafter mapped to each pixel in the group of pixels so that where one chrominance packet (e.g. U or V) before represented only one pixel, afterwards, one chrominance packet (e.g. U or V)represents a group of pixels. Thus, individual colour information for each pixel in a group of contiguous pixels is compressed to produce corresponding colour information representing not just one pixel but a group of pixels, thereby reducing the amount of colour information required to represent the totality of the raster of pixels. In a Y-U-V system, the averaging and chrominance selection is done twice, so as to derive a group-averaged U value and a group-averaged V value for each group of pixels. Additional data compression techniques, for example, using a Hadamard Transform or Cosine Transform may be chosen and implemented to further reduce the number of bits required to represent picture information for a raster of pixels. Following compression of chrominance data, picture information comprising luminance data for each pixel and chrominance data for each group of contiguous pixels (or, alternatively, if additional data compression techniques are elected, following the elected procedure to further compress the data, the data) may be formatted in accordance with applicable transmission standards and transmitted via a selected communications mode and channel.

Upon receiving the transmitted data, identification of photographic picture data is provided by a decoder. Luminance and chrominance data packets for a raster of pixels are identified. If additional compression of the picture data was performed before transmission of the data using, for example, a Hadamard Transform or Cosine Transform, the inverse of the selected compression technique is performed to provide luminance (e.g. Y) and chrominance (e.g. U, V) data packets corresponding to each pixel and each group of contiguous pixels, respectively. Luminance and chrominance data packets are stored (e.g. in random access memory) so that luminance data and chrominance data corresponding to each pixel of the raster of pixels can be readily accessed, for example, by a microprocessor. A raster address generator generates pixel addresses successively and then the luminance and chrominance data packets corresponding to the addressed pixel are retrieved from memory. The luminance and chrominance data packets are transformed in a defined manner (e.g. by a YUV to RGB linear transformation) into corresponding primary colour component data packets for the addressed pixel. A sync generator produces horizontal and vertical synchronizing signals defining the selected image area of the display screen and signalling the start of a horizontal line and new picture.

According to the present invention, a selected one of two digitally constructed data presentations, each mappable to the same raster of pixels, is converted (i.e. encoded or decoded) into the other of the two digitally constructed data presentations.

One of the data presentations (i.e. the first) is represented by one or more digital data signals, whereby each of three primary colour components of a discrete one of the raster of pixels is represented, the data signals comprising a series of primary colour data packets, each of the data packets defining the relative intensity of its associated primary colour for the pixel to which it relates. The other of the data presentations (i.e. the second) is represented by one or more digital data signals comprising a series of luminance data packets, a series of first chrominance data packets, and a series of second chrominance data packets. Each of the luminance data packets defines the luminance, according to a predetermined primary colour relationship, of a discrete one of the raster of pixels. Each of the chrominance data packets defines a luminance-colour function value for a selected group of a series of groups of said pixels. Each group of pixels comprises a selected number and array of contiguous pixels. The two sets of chrominance data packets represent two different types of luminance-colour function signal. For example, one set may be the conventional "U" set and the other the conventional "V" set of a conventional (European) Y-U-V colour television system, in digital form. In accordance with the invention, there is not a one-to-one relationship between pixels and U or V signal values. Rather, each of the first chrominance data packets for each said group of pixels represents a luminance-first colour function value that is representative of substantially the average of the individual luminance-first colour function values of the individual pixels in the group, and each of the second chrominance data packets for each said group of pixels represents a luminance-second colour function value that is representative of substantially the average of the individual luminance-second colour function values of the individual pixels in the group.

As is conventional, the luminance-colour function values are chosen so that the resultant luminance and colour associated with each group of the pixels is, to an acceptable visual satisfaction level, defined by the combination of the luminance packets and the first and second chrominance packets for such pixel. This is inherent in a Y-U-V system, the U and V values being selected so that acceptable chrominance information is transmitted.

The present invention provides encoding apparatus for converting data corresponding to the first of the two selected presentations into data corresponding to the second of the two selected presentations. In such apparatus, receiving means is provided for receiving the signals representing the series of primary colour data packets, the receiving means including communications interface apparatus to permit identification of the signals. Identification means is provided to identify three primary colour data packets for each pixel of said raster of pixels, each data packet representing a different one of each of three primary colour components of the pixel. Means are provided to produce a luminance signal representing a series of luminance values for a corresponding series of discrete pixels of the raster of pixels, including multiplication and addition means to sum predetermined proportions of the values of each of the three identified data packets representing each of three primary colour components of the pixel. Further means are provided to produce a luminance-first colour function signal, also referred to herein as a first chrominance signal or data packet, (say a U signal) representing substantially the average of the luminance-first colour function value associated with each pixel in a group of pixels of the raster of pixels, including first combining means to combine according to a first predetermined relationship the values of luminance signals representing the pixels in the group of pixels and the values of one or more of three selected primary colour components associated with the pixels in the group of pixels, such combination forming a luminance-first colour function signal (e.g. a U data packet) representative of substantially the average of the luminance-first colour function values corresponding to each pixel in the particular group of pixels for which the data are being processed. Finally, means are provided to produce a luminance-second colour function signal, also referred to herein as a second chrominance signal or data packet, (say a V signal) representing substantially the average of the luminance-second colour function value associated with each pixel in a group of pixels of the raster of pixels, including second combining means to combine according to a second predetermined relationship the values of luminance signals representing the pixels in the group of pixels and the values of one or more of the selected primary colour components associated with the pixels in the group of pixels, such combination forming a luminance-second colour function signal (e.g. a V data signal) representative of substantially the average of the luminance-second colour function signals corresponding to each pixel in the particular group of pixels for which the data are being processed. The luminance-color function relationships are determined so that the luminance-first colour function signal (e.g. U signal) and the luminance-second colour function signal (e.g. V signal) for a group of pixels represent independent colour information, which is inherent in a conventional YUV system.

When the luminance-first colour function signal, the luminance-second colour function signal and luminance signals, for a group of pixels, are suitably combined by conventional means, they satisfactorily represent the brightness and colour of each group of pixels, the colour being averaged over the group and the brightness being represented on a pixel-by-pixel basis. There is thus some loss of colour information in the conversion according to the invention, but such loss is visually acceptable if the groups of pixels selected for colour averaging are not too large in number of pixels per group. A raster divided into groups of four pixels, each group comprising a 2×2 array of contiguous pixels, has been found satisfactory for colour averaging purposes in the system disclosed herein. Identical grouping of pixels for both the first and second chrominance data packets has been found preferable in the system disclosed herein: However, if other relationships to determine chrominance values (i.e. other than those selected in the present system and disclosed herein) are selected, an alternative grouping of pixels may be preferable.

The preferred decoding apparatus for use with the video data conversion system according to the invention for converting (i.e. decoding) the second data presentation into the first data presentation above can be characterized in somewhat more detail. The receiving means preferably includes communication interface apparatus to permit identification of the data signals. Identification means is provided to identify a luminance data packet, a first chrominance data packet and a second chrominance data packet for each pixel of the raster of pixels, the data packets representing picture information for the pixel. Storing means may be included to store the data packets for subsequent retrieval and processing. Means are provided to generate for each discrete pixel position on the raster of pixels a raster address for the pixel, said addressed pixel being associated with the identified luminance and first and second chrominance data packets representing picture information for the pixel. Accessing means, which may include retrieval means to retrieve stored picture data, provides access to the luminance and first and second chrominance data packets corresponding to the pixel whose raster position corresponds to the generated raster address. Combining means produce, for each pixel, three primary colour signals comprising three data packets, using a predetermined relationship between the accessed luminance and first and second chrominance values. The combining means includes multiplication and addition means. Conversion means may be included to convert the three primary colour data packets for each pixel into three analog signals (each signal representing one of each of three primary colour components associated with the addressed pixel).

The present invention thus comprises a method and means by which photographic image colour video picture information can be transmitted and received in, for example, an information videotex system such as Telidon*, such method and means requiring fewer data bytes for transmission than present systems. The advantage of the present invention is that by requiring fewer data bytes to represent a colour video picture, the required frequency bandwidth of the selected communications channel, for transmission of the picture data, may be reduced. Alternatively, the time required for the transmission of picture data may be reduced, which is also advantageous and desirable.

SUMMARY OF THE DRAWINGS

The invention will be described by way of example only with reference to the following drawings in which.

DETAILED DESCRIPTION OF THE PREFERRRED EMBODIMENT

Figure 1:
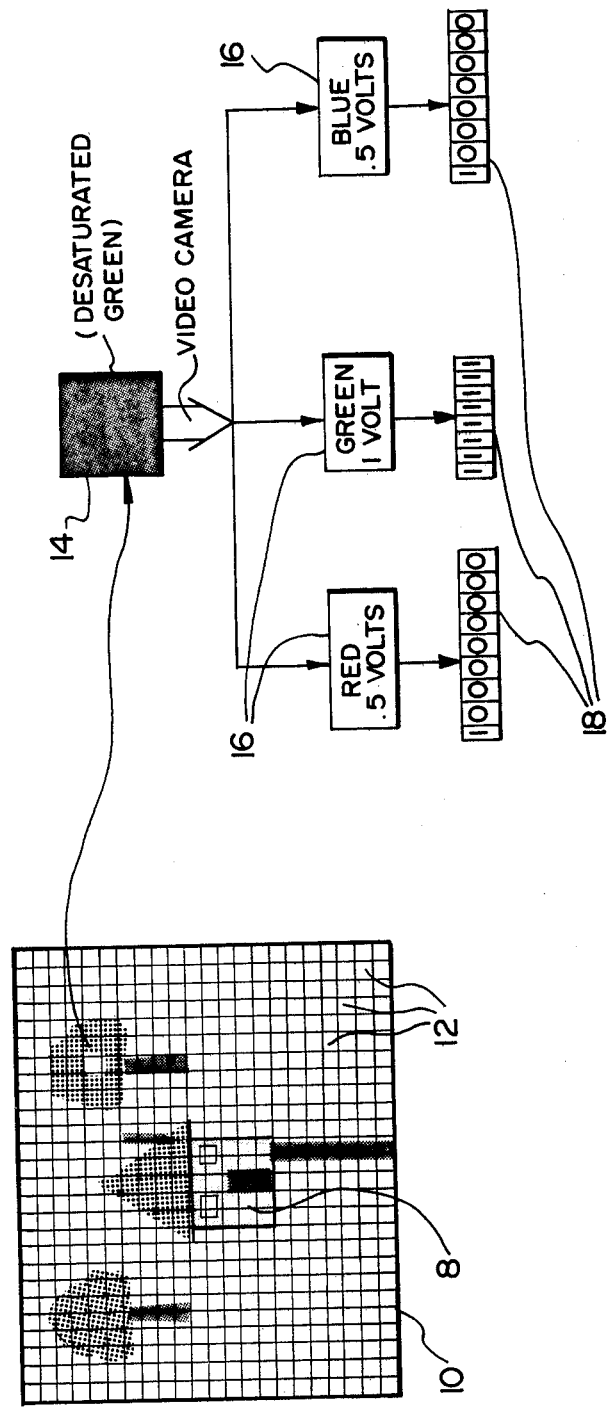
FIG. 1 is a schematic flow chart depicting a front view representation of a video screen (with illustrative schematic coarse grid) one discrete pixel thereof is shown in exploded view, and the corresponding data derived for the selected pixel illustrated in block diagram form, according to conventional practice.

In the following discussion it is assumed that a data packet is a byte (i.e. comprising 8 bits) and that the selected resolution of a video picture is 256 pixels in width by 192 pixels in height. Each pixel comprises a discrete area of a video screen, and correspondingly of any transmitted picture. For any given picture (i.e. frame) each pixel contributes specific luminance and colour information. The combination of luminance and colour information contributed by all discrete pixels in the raster defines the total picture. The greater the number of discrete pixels selected to define the picture, the greater will be the visual detail (resolution) of the resulting picture. It has been found that a resolution of 256 by 192 pixels is sufficient to define a picture having satisfactory detail. Of course, there is some upper limit for pixel area size above which the human eye is incapable of discerning further picture detail and which would result in general inefficiency if chosen for a consumer service such as Telidon*. Further, the number of horizontal and vertical pixels selected may be chosen in accordance with the desired video picture tube horizontal and vertical sweep frequencies. For example, the standards selected for North American television receivers by the National Television Standards Committee (NTSC) define the horizontal (i.e. line) frequency to be ~15.7 KHz and the vertical (i.e. field) frequency to be ~60 Hz. Also, an aspect ratio of 4:3 is defined by the standard which means that the ratio of the width to the height of the picture area is 4:3. The chosen pixel array herein of 256 by 192 conforms to that standard. Thus, a standard North American television receiver could be adapted for use with the decoder disclosed below.

The present invention is directed to colour video pictures and it is colour video pictures to which the disclosure herein shall refer; however, it should be recognized that "black and white" pictures (i.e. pictures defined by brightness, i.e. luminance, only, brightness levels going from white to black) may be incorporated into the system herein disclosed. Black and white information is merely a subset of the total range of colour picture information. That is, a black and white picture may be defined to any given resolution by the relative luminance of each pixel comprising the picture. A colour picture on the other hand, may be defined to any given resolution by the relative luminance and chrominance of each pixel comprising the picture. A given colour picture image, absent chrominance information, is simply the same image in black and white.

The present invention provides means to reduce the amount of digital colour picture information required to define a colour picture. Colour picture data is conventionally divided into three components: luminance and two independent chrominance components, the latter components permitting overall data reduction. The present invention is directed to reducing the amount of digital data required to define a colour video picture. Data reduction of black and white video pictures is not as such provided by the present invention which reduces only the chrominance data and not the luminance data.

It should also be recognized that the data reduction method and apparatus disclosed herein might be used in video systems other than videotex information systems. For example, the present invention might be adopted for use in digital television systems.

A description of a video display raster and conventional means to define a video picture digitally will now be presented.

Digital Video Colour Picture Representation

To represent a picture digitally (i.e. by a set of discrete values) it is necessary to divide the picture area into several discrete smaller areas and thereafter describe each of the smaller areas using data packets, each packet (herein selected as bytes) of digital data (i.e. picture information) corresponding to one of the defined areas of the picture. The smaller areas are known as pixels when referring to a picture area of a video screen and the array of pixels make up what is known as a screen raster.

Referring now to FIG. 1 there is shown a video screen 10 upon which an image is displayed 8. An array of pixels 12 are pictorially represented on screen 10. For convenience, to be able to pictorially represent the basic elements of a video screen described herein, a course array is shown; however, the array selected herein for actual use is of the size 256×192.

Screen pixel 14 is shown enlarged in FIG. 1 and represents an area of the display image. The area of the display image enlarged 14 is of the colour 50% desaturated green. A standard commercial video camera (e.g. a real-time digital parallel output video camera) detects the primary colour components of each pixel of the raster of pixels and represents the relative values of each primary colour component in the form of an electrical signal 16. For example, in FIG. 1, a pixel 14 is shown having the colour 50% desaturated green defined by the combination of additive primary colours red, green and blue in proportions 0.5, 1 and 0.5, respectively. Thus, three signals 16 of the values 0.5V, 1V and 0.5V may be selected to represent the visual information contributed by pixel 14. Each of the three primary colour component signals may be represented digitally by a number of bits (i.e. binary digits). Furthermore, since the relative proportion (on a fixed scale) of each primary colour present is capable of defining any given colour, the scale 0–1 may be expanded to utilize all of the selected number of bits per data packet. For example, in FIG. 1, a byte (i.e. 8 bits) 18 is selected to represent each primary colour component. Therefore, the full scale available is 0 to 255 since each byte can have a value from 0 to 255 (i.e. the numerical range provided from 8 bits being 0 to $2^8-1$). Accordingly, the signal scale 0–1V may, for example, be translated to a scale 0–255 where 0V is represented by 0 (i.e. binary 00000000) 1V is represented by 255 (i.e. binary 11111111) and the midpoint value 0.5V is represented by 128 (i.e. binary 10000000). The three illustrated data bytes 18 together represent the colour of video screen pixel 14. The number of bits required to represent visual information for a pixel in terms of primary colour components, is 24 bits per pixel (i.e. 3 bytes/pixel×8 bits/byte).

It might be noted at this point that a relatively large scale to represent the value of primary colour components, such as that provided by 8 bits, is useful for two reasons: (1) it provides a scale with a sufficient number of discrete elements to provide a one-to-one representation for units having low mathematical significance on the analog scale. For example, if an analog scale ranges from 0 to 1V, and it is desired to be able to represent both 0.015V and 0.020V digitally, (i.e. graduations of 0.005V), it would be necessary to translate the analog scale 0 to 1 to at least a digital scale of 0 to 200 (i.e. 1 divided by 0.005 being 200); and (2) practically, it is convenient to work with bytes because circuitry such as a communications bus, memory and microprocessor commonly function (i.e. execute) in bytes or multiple bytes at a time.

Having completed a description of the process of digitally representing a video colour picture the process of translating primary colour information to luminance and chrominance information will now be described.

Red, Green, Blue/Luminance, Chrominance Translation

As outlined above, it is known that all colours can be obtained by summing some proportion of three primary colours. If the additive primary colours red, green and blue are selected, all colours can be produced by combining some proportion of red, some proportion of green and some proportion of blue. That is, one unit of equal energy white light can be produced by combining x units of red light, y units of green light and z units of blue light. However, x, y and z are not equal because the human eye is not equally sensitive to each colour.

Black refers to the absence of light and therefore, is the combination of 0 red, 0 green and 0 blue. Saturated red refers to red alone and can be represented as one unit of red only (i.e. 0 green and 0 blue). Desaturated red refers to the combination red plus white light. As noted above, the sensitivity of the human eye is not the same for each primary colour and therefore the luminance contributed by red, green and blue light is not in equal proportion. Instead, the values x, y and z identified above equal 0.30, 0.59 and 0.11, respectively. That is, 0.30 units of red light plus 0.59 units of green light plus 0.11 units of blue light combine to form one unit of white light ("unit" meaning a unit of measurement). What is normally referred to as a black and white picture is really just a luminance picture, each point on the picture being defined by luminosity only (i.e. brightness). Varying degrees of luminance from black to full white are produced by different factors of the same relative proportions of red, green and blue light as full white light.

Colour or chrominance information (unscaled) is conventionally defined, for each primary colour, by the luminance value minus the primary colour value. Also, it is known that luminance plus any two of the three possible independent chrominance values (commonly referred to as colour difference values) are capable of defining a light source completely. That is, it is not necessary to define the luminance and three colour-difference values to define a light source because the third colour-difference value adds only redundant information.

The colour-difference quantities used in both American (NTSC) and European (PAL) television systems are the red-luminance and blue-luminance quantities, though in each system these quantities are scaled and combined differently. European-type colour television colour-difference quantities have been chosen to define colour picture information in the system disclosed herein (that is, the "U" and "V" quantities have been selected). Of course, though, any number of combinations of luminance and colour component values which are capable of fully defining a light source might be selected.

The colour-difference signals used herein (as in the European PAL system) are defined by the following relationships:

$$\left. \begin{array}{l} U = .877 (R - Y) \\ V = .493 (B - Y) \text{ and,} \\ Y = .30R + .59G + .11B \end{array} \right\} \quad (1)$$

where U and V are the first and second chrominance (i.e. colour difference) values, respectively, R is the red colour component, B is the blue colour component and Y is the total luminance contributed by the primary colour components (as described above). The factors 0.877 and 0.493, scaling the absolute value of colour-differences R-Y and B-Y, were chosen to correspond with the European analog television system. It will be appreciated that if, for example, R, G and B values range from 0 to 1 Volt, the resulting luminance value range will be 0 to 1 Volt. Since, in analog television, the chrominance signals are transmitted by modulating the amplitude of the same selected frequency (but with a defined phase difference) the maximum amplitude of the modulating signals (i.e. the chrominance signals) must be limited to avoid over-modulation. The factors 0.877 and 0.493 were chosen in the European system so that chrominance signals are less likely to over-modulate the selected carrier signal.

In the general case, since the term "colour difference value" might be misinterpretted as requiring a difference quantity between two colour values, the term luminance-colour function value has been selected to refer to a chrominance value. "Function" is used because the relationships selected to define chrominance are more generally defined as function and are not limited to the selection of difference relationships.

Using scaler factors 0.877 and 0.493, for U and V, respectively, analog chrominance signals range from $-0.615V$ to $+0.615V$ and $-0.436V$ to $+0.436V$, respectively. Again, it should be recognized that the system disclosed herein was chosen to correspond to an analog television system for convenience only and there is no operational necessity to have chosen the chrominance relationships (1) described above. However, one advantage in doing so is that because the sensitivity of the human eye to the U and V components defined above is substantially equal, the selected grouping of pixels (discussed herein) to be associated with each chrominance value (i.e. U and V component) can be the same to provide satisfactory results.

Due to the scaling factors 0.877 and 0.493, the maximum absolute values resulting for U and V signals are 0.615 Volts and 0.436 Volts, respectively, if colour component signals R, G and B range from 0 to 1V, in which case Y, the luminance signal also ranges from 0 to 1V. The chrominance values and, therefore, signals, can be positive or negative. The luminance and chrominance values for a pixel, derived from a set of primary colour component values (i.e. R, G, B) for a pixel, may be represented in digital form so that one byte each represents the value Y, U and V. Signed bytes may be used to designate a negative value. That is, the most significant bit can be used to indicate a negative value by setting it to "1" and the other seven bits of the byte are then used to represent the absolute numerical value. Accordingly, if the 8th bit is used to indicate polarity, the maximum range provided to represent U and V values is $\pm 2^7 - 1$ (i.e. $\pm 127$).

To recreate primary colour component values from luminance (Y) and U and V chrominance values using the absolute value of U and V (i.e. ignoring the polarity of U and V) it is necessary to scale the U and V components first to translate them from a negative-to-positive range to a zero-to-positive range, from which R, G and B components may be determined using the above-noted relationships (1) for Y, U and V in terms of R, G and B. The scaling required in the present system, where the range of U and V signals is $\pm 0.615V$ and $\pm 0.436V$, respectively, is 1/1.23 and 1/0.872, respectively (i.e. $1/(0.615 - -0.615)$ and $1/(0.436 - -0.436)$, respectively). The following relationships, used in the present system, incorporate these scaling factors for U and V, so that the specified values, U and V, are absolute values of U and V:

$$R = Y + 1.402U$$
$$G = Y - 0 - .715U - 0.344V \qquad (2)$$
$$B = Y + 1.770V$$

where R, G, B, Y, U and V are defined as in (1) above. It will be noted that if before translation of the values R, G and B to Y, U and V, according to relationships (1) above, the values R, G and B were represented by the 8 bit range 0 to 255, the same numerical range (i.e. 0 to 255) for values R, G and B will result from relationships (2) above. Of course though, computational rounding errors etc. may result in minor differences between the two sets of R, G and B values.

Having described the method of conversion of primary colour data to luminance and chrominance data, and vice versa, both providing complete definition of a light source, the method of compressing digital chrominance data corresponding to pixel colour information is discussed in the following.

Compression of Digital Chrominance Data

It is known that sensors in the human eye, called rods and cones, are substantially responsible for recognition of colour and luminance (i.e. brightness), respectively. However, there are about one-quarter the number of rods as there are cones, resulting in lower sensitivity to colour than luminance. Accordingly, one-quarter the amount of colour information as compared to luminance information is able to define an image sufficiently for the purpose of human perception. Any greater amount of colour information tends to be redundant.

Standard analog colour television utilizes this fact by filtering out all but a lower band of frequencies of a chrominance signal comprising chrominance information before modulating and broadcasting analog video signals, the transmitted frequency band for chrominance signals being less than that for luminance signals (luminance signals comprising picture luminance information). Filtering (i.e. omitting) higher frquencies comprisng colour information, effectively removes a certain amount of information pertaining to rapid colour variation over a given area, but, because the human eye is insensitive to much of this information, the loss of information does not have a noticeable effect on the image perceived by the human eye. This is particularly true in the blue-green colour range.

It has been found by the present inventors that the above described response of the human eye to colour and luminance can be used to reduce the amount of digital data needed to describe a video colour picture on a pixel-to-pixel basis, even though picture information is in discrete form not capable of being modified appropriately by filtering, as with analog signals.

Figure 2:
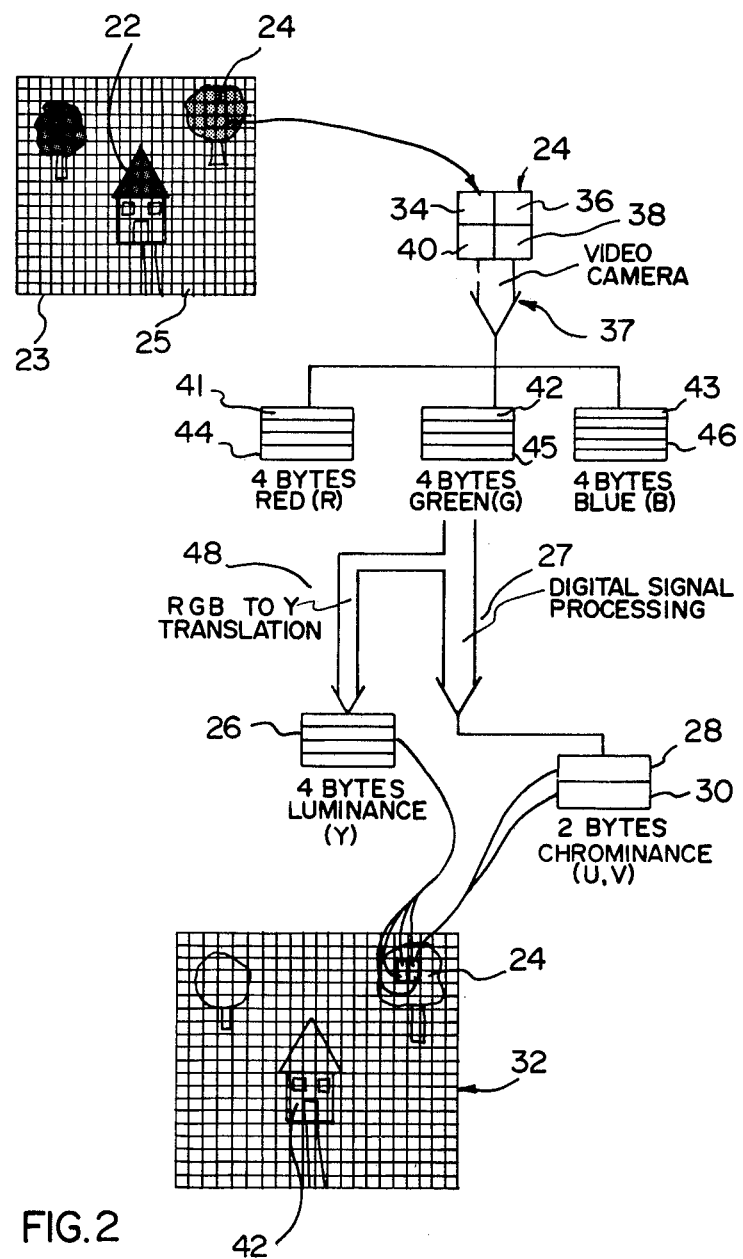
FIG. 2 is a schematic flow chart illustrating a method of compression of digital video chrominance data according to the invention.

Referring to FIG. 2 there is illustrated in pictorial form an image 22 overlayed with a raster of pixels (i.e. a grid) 23 each pixel 25 (i.e. area element) representing a portion of the image 22. The resolution of the image represented by the array of pixels is determined by the number of pixels in the area (the number illustrated being substantially reduced for the purpose of illustration). Primary colour component information pertaining to the raster of pixels 23 is determined by a video camera 37 and represented in digital form. FIG. 2 illustrates this process for one group of four contiguous pixels 24 of the raster of pixels 32 though the process applies to all pixels of the raster, grouped in a two-by-two array of pixels, resulting in a reproduction of the image 42 on a video screen.

For each pixel 34, 36, 38, 40 of the group of pixels 24 the video camera produces three primary colour component values each represented by a data byte 41, 42, 43. Accordingly, for the group of four pixels 24 the video camera produces 12 data bytes representing colour information for the pixels, three data bytes for each pixel, each of the three representing a different one of three primary colour components of a pixel. Then, the primary colour component data bytes 44, 45, 46 are processed 27 according to known digital signal processing techniques to digitally filter the combined colour information of the four pixels and sample the result to produce smoothed chrominance data comprising two (i.e. first and second) chrominance data bytes 28, 30, representing, effectively, substantially the average of chrominance values U and V corresponding to the four pixels 34, 36, 38, 40. It should be recognized that there are many ways to smooth digital data to produce corresponding digital data representing substantially the average of the data values. In the present system, the primary colour component values for each pixel 34, 36, 38 and 40 are translated to determine each corresponding U and V chrominance value (according to the relationship (1) above), producing a U and V chrominance value for each pixel, and then each of the resulting groups of four U and four V chrominance values are digitally processed to produce one smoothed U and one smoothed V chrominance value representing the group of pixels 24. Accordingly, the colour data corresponding to pixels 34, 36, 38 and 40 is compressed by a factor of four, four U data bytes representing pixels 34, 36, 38, 40 being reduced to one U data byte representing the group of pixels 24 and four V data bytes representing pixels 34, 36, 38, 40 being reduced to one V data byte representing the group of pixels 24.

It will be recognized by the reader that digital signal processing can be accomplished by hardware or software means (or a combination of the two). In the system disclosed herein the data processing prior to transmission was done using a computer programmed to process the video colour data in accordance with appropriate known mathematical steps to smooth the data (i.e. filter and sample the data). Programs to accomplish the required smoothing, or averaging, of data bytes are well known in the art and can be produced by anyone skilled in the art. The particular program used in the present system does not comprise a part of the present invention. If speed is of primary concern the required digital signal processing to smooth discrete pixel colour data could be implemented by hardware circuitry (i.e. increasing the number of discrete devices needed but reducing the number of intermediate instructions, or decisions, required to be executed by a computer implementation).

Luminance information comprising a Y data byte 26 is produced for each pixel 34, 36, 38, 40 by translating the primary colour component values for each pixel 44, 45, 46 to the corresponding Y value in accordance with relationship (1) above. Accordingly, the resulting luminance data value corresponding to each pixel 34, 36, 38, 40 is independently determined for each of said pixels 34, 36, 38, 40 and there is no compression of luminance data corresponding to the above-described compression of colour information.

Having described the data compression method of the present invention, a system incorporating the data compression process is described in the following.

Digital Video Data Compression System

Figure 3:
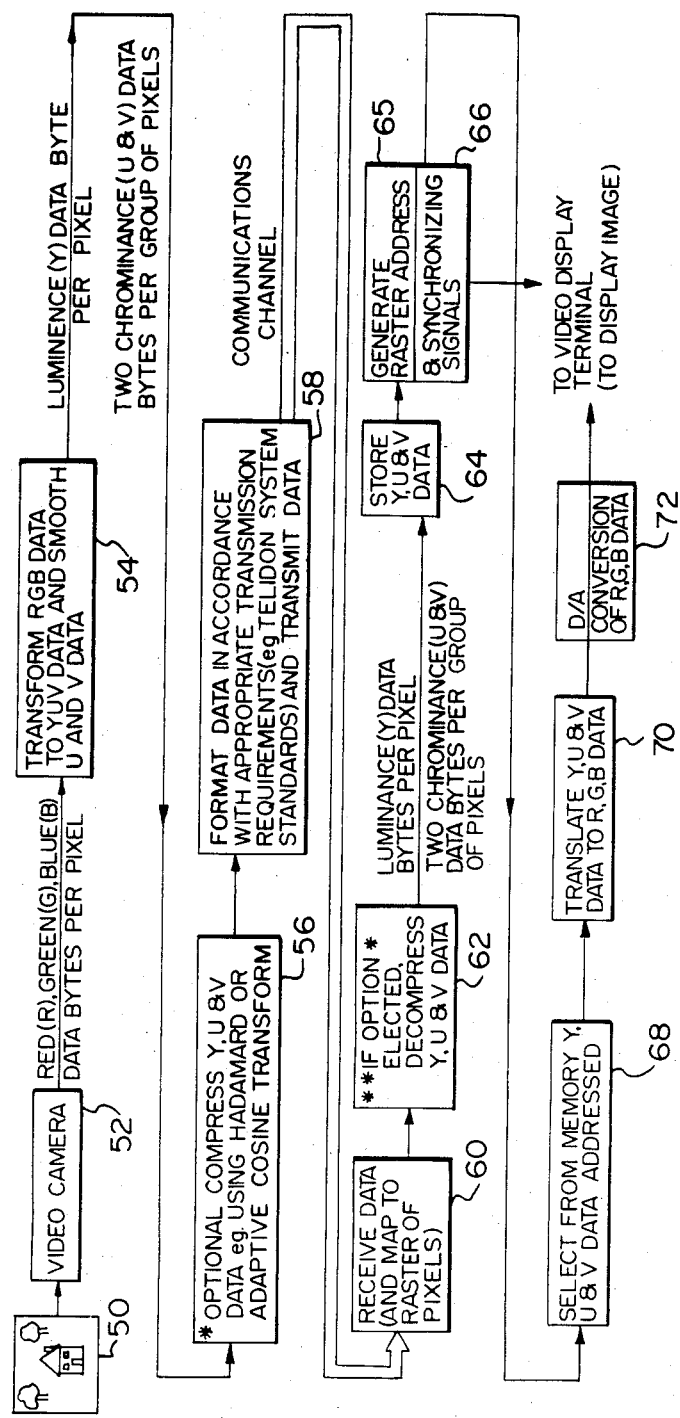
FIG. 3 is a flow chart illustrating a digital data conversion system for photographic video picture information, according to the invention.

General components of a system to encode, transmit, receive and display video colour picture information, in digital form, is illustrated in block diagram form in FIG. 3. A colour image 50 is recorded by a colour video camera 52 which produces a sequence of data bytes representing primary colour component values of a raster of pixels the raster comprising the total image 50. The video camera 52 may be, for example, a real-time parallel line video camera producing three digital output bytes simultaneously, each byte corresponding to a discrete pixel of a raster of pixels and each byte comprising a value representing one of three primary colour component values of the pixel. The picture (raster) data bytes representing primary colour components, for example, red, green and blue, are then translated and compressed 54 for each group of pixels in accordance with the process of FIG. 2, described above, to produce corresponding luminance and first and second chrominance values for the group of pixels each value represented by a data byte.

If desired, the translated and compressed digital video picture data 54 can be further compressed 56 using one of a number of known data compression techniques, such as those methods using a Hadamard Transform or Cosine Transform. (Previously published information theory and/or data coding textbooks can be referred to for a description of the mathematical theory and procedure pertaining to such compression methods.) In the present system it was found that the amount of digital data required to satisfactorily define a video colour picture having a resolution of 256×192 can be reduced to approximately 3 bits/pixel using the Hadamard Transform or Cosine Transform methods. However, the degree of compression elected, i.e. the final number of bits per pixel, will depend upon the picture quality desired. As indicated above, the disclosed conversion and compression by a factor of 4, of red, green and blue primary colour information to U and V chrominance information does not have a substantially noticeable affect on the quality of the picture reproduced from the compressed information, since the human eye is about one-quarter as sensitive to colour as it is to brightness (i.e. luminance). However, further compression of the picture data using, for example, a Hadamard or Cosine Transform does result in increasing reduction in picture quality as the degree of compression is increased (i.e. as the number of bits/pixel decreases).

When the video picture data has been translated and compressed to produce YUV data bytes as described above, and, if desired, further compressed using a selected compression method, the video picture data is formatted appropriately for transmission through the selected communications channel and transmitted via the selected channel 58. For example, if the video picture data is to be incorporated into a standard television broadcast signal the video data must be formatted in accordance with NAPLPS standards and appropriately incorporated into the allocated broadcast signal.

The video picture data is then received and the data bytes corresponding to the raster of pixels are identified 60. If optional compression of picture data was elected 56 the data is decompressed 62 by the inverse of the chosen compression method to produce luminance (Y) data bytes, each byte corresponding to one pixel, and U and V chrominance data bytes each U data byte corresponding to a group of pixels and each V data byte corresponding to a like group of pixels. The Y, U and V data bytes are then stored 64, for example, in random access memory, and raster addresses corresponding to each pixel of a video display screen are generated 65, together with synchronizing signals 66 which permit formatting of pixel data with respect to the display screen area. The Y, U and V picture data bytes corresponding to the addressed pixel of the raster are then accessed 68 and translated into corresponding R, G and B data values 70 (i.e. red, green and blue primary colour component values) according to relationship (2) above. Next, the data bytes representing red, green and blue colour components of the addressed pixel are converted to corresponding analog signals 72. Synchronizing signals are produced and those signals 66 together with analog red, green and blue colour component signals 72 are then provided to an R-G-B video display terminal (i.e. each colour component signal is used to drive the appropriate electron gun of a cathode ray tube (CRT)).

For example, the raster address corresponding to the pixel position row 1, column 1 is generated 65 before the display of a picture on the screen commences and a synchronizing signal is produced to indicate that the display of a new image is beginning, causing the electron guns of the terminal to be turned on. The Y, U, and V picture data (i.e. information), corresponding to the pixel position row 1 column 1, is retrieved from memory 68, translated to R, G, and B data 70 and converted to analog form 72 to drive R, G and B electron guns of an R-G-B display terminal, thereby producing the appropriate colour intensities at pixel location row 1 column 1 on the display screen.

To display the video picture on an ordinary television screen analog signals R, G and B 72 and synchronizing signals 66 must be transformed into appropriate broadcast-type television signals compatible with the selected television receiver, according to standard methods of producing the desired television signals from analog R, G and B signals.

Procedure to Encode Video Information

Figure 4:
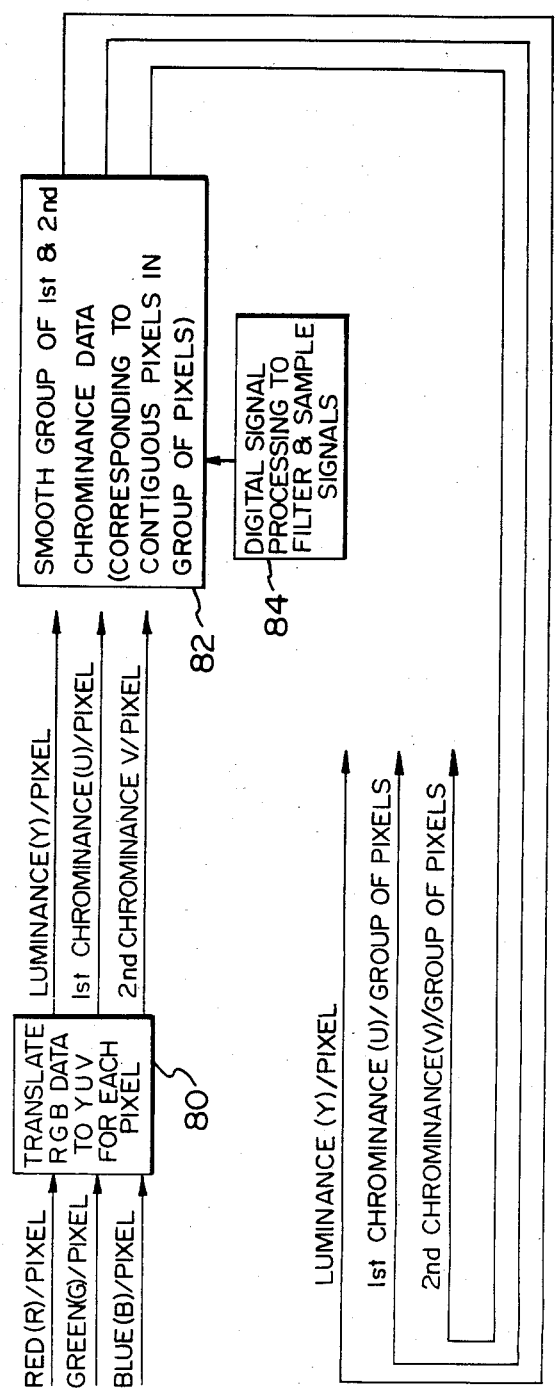
FIG. 4 is a flow chart illustrating a process for encoding photographic video colour picture information according to the invention.

For the system disclosed herein the selected method of translating and compressing digital video picture data is illustrated in block diagram form in FIG. 4.

As described above, the chosen procedure of encoding R, G and B picture data bytes into luminance (Y) and compressed U and V chrominance data bytes is one of many which might be implemented to effectively average a number of digitally represented data values (i.e. here, groups of digital chrominance data values). Accordingly, it should be understood that the scope of the present invention includes mathematical processing variations of the smoothing procedure disclosed herein. In the disclosed system, primary colour component data bytes (R, G and B data bytes), each byte corresponding to discrete picture areas (i.e. pixels), are produced by a video camera. The number of discrete areas comprising the picture is fixed and determines the resolution of the picture recorded by the video camera. The primary colour data bytes for each pixel are translated 80 according to relationship (1) above to form like number of data bytes, consisting of one luminance data byte (Y) and two chrominance data bytes U, V so that all of the picture information contained in the primary colour data bytes (R, G and B) is also contained in the luminance and chrominance data bytes (Y, U and V) derived therefrom. Thus, picture information has not been lost by R-G-B to Y-U-V translation but only represented in different form, according to brightness and colour components. Following the translation of R-G-B data to Y-U-V data there is one Y, U and V data byte representing each pixel of the raster of pixels, the raster of pixels representing the picture.

RGB data-YUV data translation 80 can be performed by hardware or software means, as desired. To do so in hardware an appropriate circuit comprising digital multipliers, adders etc. can be readily designed to implement the translation according to the selected relationship. For example, if relationship (1) above is selected, the Y data byte is produced by summing proportions of each primary colour component data byte R, G and B. This could be accomplished in hardware by three digital multipliers to scale the R, G and B values by the required factor and two digital adders to add the three multiplier outputs together.

In the present system, translation of R-G-B data to Y-U-V data is accomplished using a computer, controlled by an appropriate instruction set (i.e. computer program). The actual instruction set used to effect the translation depends upon several variables, one being the type of computer selected (i.e. the computer architecture).

Following RGB-YUV translation 80, groups of U and V data bytes corresponding to contiguous pixels are smoothed 82 to produce substantially the average of the values of U and V data bytes in the group. In the present system a group of four contiguous pixels comprising a two-by-two array is chosen and is found to produce satisfactory results. That is, the quality of the picture reproduced from Y, U and V data compressed in accordance with the foregoing, is considered to be good as compared visually with the original picture recorded by the video camera. Again, the smoothing (i.e. averaging) process 82 could be accomplished through hardware means if desired; however, if processing time is not critical it is convenient to accomplish smoothing of groups of data bytes (here four data bytes) using a computer controlled by an appropriate set of instructions.

In the present system groups of four U chrominance and V chrominance data bytes are smoothed using a conventional data processing machine programmed in a predetermined conventional manner. The processor, operates on the data bytes according to standard digital processing techniques to smooth data 84, including mathematical techniques for digital filtering and sampling of the data. The specific computer program produced and used in the present system is not incorporated into the present invention as claimed. A variety of programs to appropriately smooth data can be produced by one skilled in the art. Smoothing means 82 and 84 produce one U chrominance and one V chrominance data byte for each group of like data bytes, each U and V data byte representing substantially the average of the individual U and V values in the group. Thus, for every group of four U (or V) chrominance data bytes which are smoothed 82 there is produced one U (or V) chrominance data byte representing each of the pixels in the group of pixels corresponding to the four input U (or V) chrominance data bytes. To repeat, it should be recognized that the scope of the present invention includes other (equivalent) methods of smoothing (i.e. averaging) groups of discrete colour information data bytes. For example, instead of producing individual U and V chrominance data bytes for each pixel 80 and then smoothing a group of discrete U and V chrominance data bytes, groups of discrete colour component data bytes R, G and B might be smoothed to produce average values of R, G and B data values corresponding to a group of values and then the average R, G and B values translated to produce corresponding U and V average values.

Having completed a discussion of the process of encoding video image information in the present system a description of the process of decoding video image information follows.

Decoder

Figure 5:
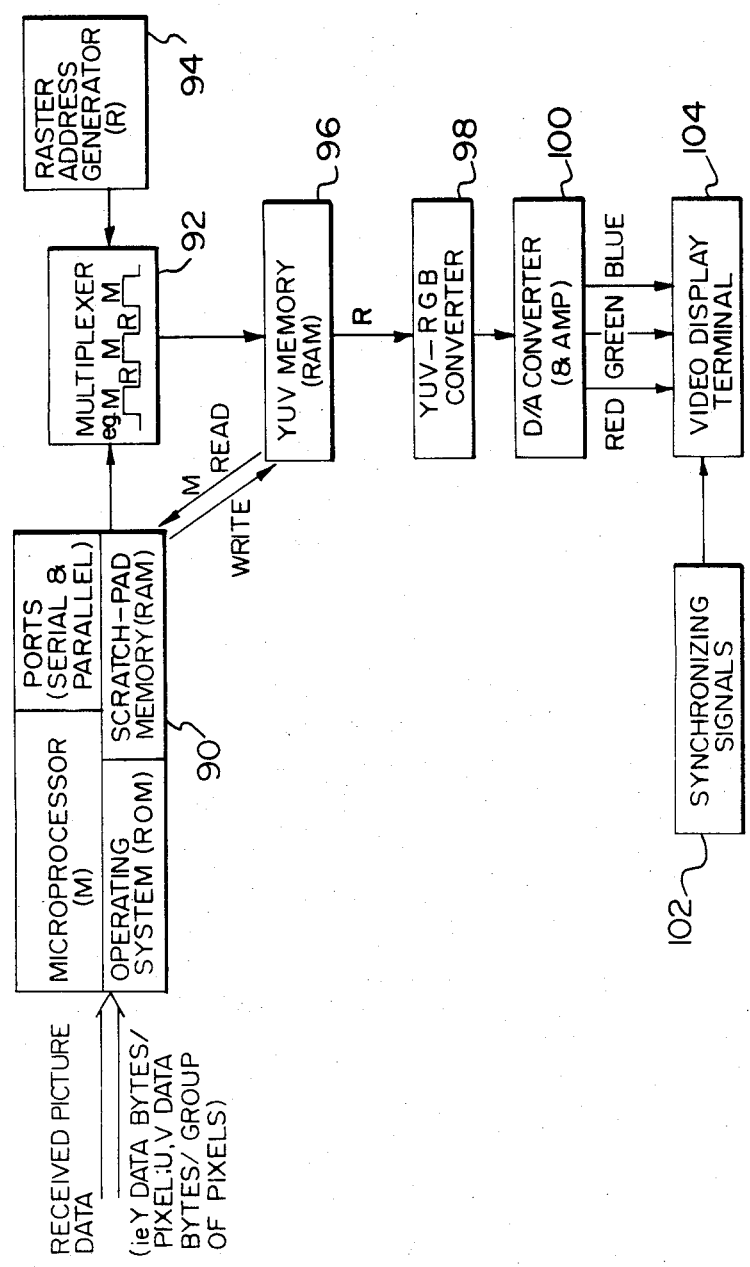
FIG. 5 is a flow chart illustrating a process according to the invention to decode photographic video colour picture information which has been encoded according to the process of FIG. 3.

FIG. 5 shows in block diagram form the circuitry used in the present system to decode digital video picture data comprising luminance (Y) and U and V chrominance data bytes, the U and V data bytes having been compressed in accordance with the procedure to encode video information disclosed above, one Y data byte representing one pixel, and one U and V data byte representing each pixel in a group of contiguous pixels.

It should be recognized that for any given circuit device used to accomplish a particular task there are a large number of different devices available in the marketplace which function equivalently and which might be used to accomplish the required task. Accordingly, examples of devices provided in the following are given only for the purpose of illustration and are not intended to confine or limit the scope of the present invention. In the decoder described herein, the microprocessor selected is of the 68B09 line, manufactured by Motorola Inc., being an 8 bit processor, having eight data lines and 16 address lines, and a clock frequency of 2 MHz.

Microprocessor 90, including its associated operating system program fixed in read only memory (ROM), working area random access memory (RAM) and ports (serial and parallel), receives digital video picture data comprising one luminance (Y) data byte per pixel and one U and one Y chrominance data byte per group of contiguous pixels (in the present system, a group comprising four pixels of a two-by-two array). The operating system controlling the microprocessor includes logic means to recognize photographic video data and identify Y, U and V data bytes corresponding to discrete pixels, the data being in a format permitting such recognition and identification. For example, if photographic video data is provided through the Telidon* or similar system, the received data could consist of a variety of forms such as graphic, text or photographic picture form, the microprocessor operating system permitting identification of each different form. In the Telidon* system information regarding the form of subsequent data is provided according to a standard code (NAPLPS) as discussed above. The microprocessor receives the codeword and if the codeword is for photographic video data, the operating system directs the microprocessor to receive the photographic video data (which is in a known format) and identify it according to Y, U or V data byte and corresponding pixel location.

As microprocessor 90 receives Y, U or V data corresponding to a pixel its associated operating system causes it to produce the address of the memory location in RAM selected to store the received data byte, the memory location being mapped to the particular pixel.

As stated in the definition section above, depending upon the microprocessor selected there may be 16 or 24 or some other number of address lines each line specifying one bit of an address. RAM 96 used to store Y, U and V data is memory mapped to the microprocessor appropriately to permit addressing thereof by the microprocessor, the microprocessor addressing the appropriate Y, U and V RAM location corresponding to the received data byte and storing the data byte at that location.

Y, U and V RAM 96 is available to both a raster address generator 94, which produces appropriate video raster addresses to display corresponding data on a video screen, and microprocessor 90 on a 50% time sharing basis. A multiplexer (e.g. two-to-one selector) 92 provides switching means to select one of either the microprocessor address lines or raster address lines. Various switching means are available to accomplish selection of one of two sets of lines. In the present system a series of single pole double throw electronic switches of the 74LS257 TTL type are used, each switch selecting between one address line of microprocessor 90 and one line of raster address generator 94. The switches are cycled at a frequency of 6.058 MHz (which is the same clock frequency used to operate microprocessor 90), called the master pixel clock rate, in such a manner that when the clock pulse is high (i.e. binary 1), consisting of a half of a cycle, the address lines of microprocessor 90 access (i.e. are connected to) YUV memory 96 and when the clock pulse is low (i.e. binary 0) the address lines of raster address generator 94 access, (i.e. are connected to) YUV memory 96, each high and low time period being the same (i.e. $0.5 \times 1/6.058$ micro seconds). However, it will be recognized by the reader that a time-sharing basis of 50% is not essential to the present invention and a number of other address line time-sharing arrangements might be suitable.

When the address lines of microprocessor 90 hold the address of YUV memory 96 and are switched on by multiplexer 92, received Y, U or V data bytes corresponding to the address are written (i.e. stored) into the addressed Y, U or V memory location (i.e. the memory location mapped to that address). Alternatively, if any particular data byte stored in the addressed Y, U, or, V memory location is required by the microprocessor for any reason it may be read when the microprocessor's address lines have access to YUV memory 96 (i.e. when the master pixel clock is binary 1).

In the present embodiment, microprocessor 90 causes all U and V memory locations to be cleared when it recognizes that photographic picture data is about to be received (i.e. when it receives a Telidon* control codeword signalling photograpic data) so that only new picture information will be provided to the video display screen rather than new luminance (Y) information together with colour information pertaining to the previous picture (i.e. chrominance (U, V) information) already in YUV memory 96. This is because in the embodiment herein the photographic video signal considered is transmitted and received serially in a format whereby all luminance (Y) data bytes are received first and then all U chrominance data bytes are received and, lastly, all V chrominance data bytes are received. Since the video raster YUV data is accessed independently by microprocessor 90 (and thus independently from the writing of YUV data into YUV memory 96) and raster address generator 94 (which accesses a Y, U and V data byte corresponding to the same pixel upon each pixel clock cycle i.e. a Y, U and V data byte are all accessed and not just one Y, U or V data byte) it is preferable to clear previous chrominance data when each new picture data sequence is received. Otherwise, the resulting video display image reproduced will for some time period depict a combination of two pictures (i.e. the new picture and the previous picture). Furthermore, the time required by the microprocessor to write picture data into YUV memory 96 is greater than the time required to cycle raster addresses by raster address generator 94 which means that, for example, eight pixels might be addressed and displayed while only the two memory locations have been updated with currently received Y, U or V picture information by microprocessor 90. (The time difference is, of course, due to the processing time required by the microprocessor and/or data transmission time. It may take, for example, several clock cycles for the microprocessor to execute one instruction of the operating system.)

It will be noted from the above discussion that the access of YUV memory 96 by raster address generator 94 is asynchronous to the access of YUV memory 96 by microprocessor 90, in that microprocessor 90 operates independently from raster address generator 94 and can address any selected memory location regardless of the memory location addressed by raster address generator 94. Microprocessor 90 is permitted control of the YUV memory 96 data bus during each time period when the master pixel clock is a binary 1 but it is not necessary for the microprocessor to in fact address YUV memory 96 during each of those time periods. For example, microprocessor 90 might take ten pixel cycles to decide (logically), in conjunction with its operating system, that all Y data bytes have been received, that the present data byte is a U data byte, and that the address of YUV memory 96 where the U data byte is required to be written is X ("X" denoting an address). During this time period microprocessor 90 is not addressing a YUV memory location and so, does not access YUV memory 96 during several of its permitted time periods to do so (i.e. each half master pixel clock cycle). Raster address generator 94, on the other hand, always cycles to produce the next pixel address and accesses YUV memory 96 each time it is permitted to do so (i.e. each half master pixel clock cycle). This asynchronous bus sharing method enables efficient YUV data transfer to both the input and output of data (i.e. input by microprocessor 90 and output by raster address generator 94).

When the pixel clock pulse is low (i.e. binary 0) the address generated by raster address generator 94 causes the Y, U and V data bytes corresponding to that address (the data bytes also corresponding to the display pixel having that raster address) to be available from YUV memory 96. In the present system 5 sets of 8 16K RAMs are used to store YUV data; three sets for Y data (mapped to microprocessor 90 as 0 to 48K), one set for U data (also mapped to microprocessor 90 as 0 to 48K) and one set for V data (also mapped to microprocessor 90 as 0 to 48K). Recall that $256 \times 192$ (i.e. 48K) Y data bytes and $256 \times 196 \times \frac{1}{4}$ (i.e. 12K) U and V data bytes each are associated with each raster of pixels (i.e. one picture). In the present system, Y, U and V memory locations corresponding to the addressed pixel are addressed simultaneously when raster address generator 94 has access to YUV memory 96. For example, one address, say, address 1100000000000000 (i.e 48K) will address one byte each of Y, U and V RAMS simultaneously, each byte being the byte stored at address 1100000000000000 of said RAMS. It will be noted that only one U and one V RAM is used, and that only 12K bytes of U and V data is required and stored per raster which means that the address 1100000000000000 does not directly correspond to a U or V RAM location. Accordingly, in the present decoder, only 14 address lines are in fact connected to the U and V RAMS in such a manner that the 16 bit address is divided by four and the resulting address is the address of the U and V memory locations associated with the Y memory location corresponding to the addressed pixel. That is, for each of four contiguous pixels in the present system, being four pixels comprising a two-by-two array, the same U and V memory location is addressed.

It will be noted that the above arrangement of Y, U and V memory address lines resulting in simultaneous (i.e. dependent) access of Y, U and V memory locations is not desirable when microprocessor 90 accesses YUV memory 96 since only one data byte, being either a Y, U or V data byte, is desired to be written to YUV memory 96 at one time. Accordingly, in the present system only the appropriate RAM is addressed by microprocessor 90 (i.e. one of the Y RAMs or the U or V RAM) by using two register data bits, memory mapped to microprocessor 90, to select (i.e. enable) the desired RAM. This process of allocating memory mapped to a microprocessor is referred to as memory mapping logic (or bank select logic) and will vary in detail depending upon the chosen scheme of memory mapping—which in turn is selected according to, inter alia, preference. To illustrate the above, if Y data is being received via the communications channel and is required to be written in the address of YUV memory 96 which corresponds to the received Y data byte, it is necessary to ensure that the received data byte is written in only the one corresponding Y memory location and not the corresponding U or V memory location. Otherwise, data stored at corresponding U and V memory locations would be lost by overwriting data at those locations. Therefore, microprocessor 90 (directed by its associated operating system instruction set) first accesses two memory locations mapped to two bank select register bits (which could be any memory locations available to the microprocessor which are not already mapped to the microprocessor for dedicated use) and sets the register bits to either 1, 2 or 3 (i.e. binary 01, 10 or 11) corresponding to the Y RAMS, U RAM and V RAM, respectively. The bank select register bits are wired to the Y, U and V RAM devices in such a way that the desired Y, U or V RAM is accessed by the microprocessor only when it has been set (i.e. enabled) by its corresponding bank select number which is set by microprocessor 90 before it accesses the Y, U or V RAMs. As indicated above the selected scheme of mapping memory to microprocessor 90 is essentially arbitrary and any number of functionally equivalent schemes might be selected to implement the present invention. The choice of memory mapping will depend upon, for example, the chosen microprocessor (i.e. the number of address and data lines it has), the selected picture resolution (i.e. the number of pixels used and corresponding number of Y, U and V data bytes), the memory devices selected and programming preference.

When multiplexer 92 is low (i.e. binary 0) and the address generated by raster address generator 94 is electronically switched to couple to the address lines of YUV memory 96, the data stored at the addressed YUV memory locations, being one each Y, U and V memory location, is provided by YUV memory 96 in digital form (i.e. one byte each of Y, U and V data).

Figure 6:
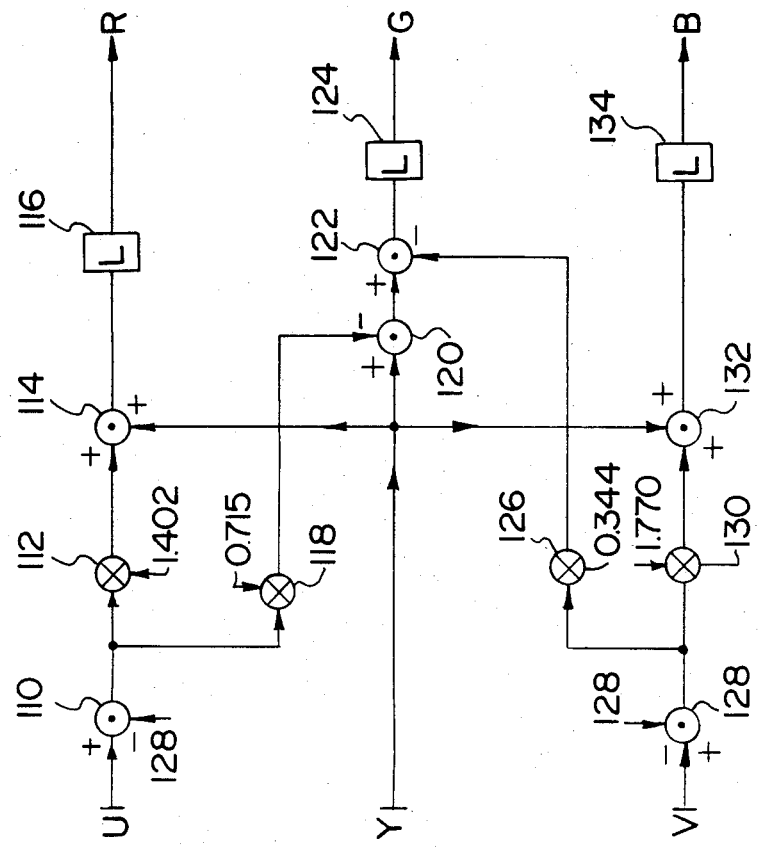
FIG. 6 is a circuit diagram of a YUV-RGB converter for converting luminance and chrominance digital data into red, green and blue colour data.

Y, U and V data bytes are then converted 98 to corresponding primary colour component data bytes referred to as R, G and B data bytes. FIG. 6 illustrates the process of conversion 98 in greater detail. Referring now to FIG. 6 there is shown a schematic of a circuit which might be used to accomplish the conversion of digital YUV data to corresponding digital RGB data; eight bit data packets (i.e. data bytes) are assumed. Three circuit devices are illustrated: (1) digital multipliers 112, 118, 126, 130 which multiply the numerical values of two input data bytes to produce the product of the two input values at the output. A variety of standard devices of this type are available in the marketplace. In the present system 8 and 9 bit multiplier PROMs are used. (2) digital adders 110, 114, 120, 122, 128 and 132 which add the numerical values of two input data bytes to produce the sum of the two input values at the output. If one input data byte is negative and the other is positive the sum produced will be, effectively, the difference of the two values since a positive number added to a negative number produces the difference between the two numbers i.e. subtraction is performed. Again, a variety of standard devices of this type are available in the marketplace. In the present system 12 bit arithmetic logic units are used with the lines corresponding to the three most significant bits being tied together where the outputs are required as inputs to 9 bit multipliers, and (3) digital limiters 116, 124, 134 which limit the input data to a maximum numerical value of 255 (i.e. 8 bits). The limiters are used to ensure that the output R, G and B values occurring at the output of adders 114, 122 and 132 are no more than 8 bit numbers. The limiters are required in the present embodiment because the R, G, and B output data bytes are used by eight bit digital-to-analog devices (referred to below) requiring input data having 8 bits only. Although the RGB data output of adders 114, 122 and 132, respectively, should not in the ordinary course comprise values consisting of more than eight bits, it is possible that larger numbers (represented by more than eight bits) will be produced due to erroneous received data or circuit device malfunctions. Of course limiters 116, 124 and 134 may not be necessary or desirable in some other embodiments of the present invention.

Still referring to FIG. 6 the circuitry illustrated accomplishes the conversion of YUV data bytes to RGB data bytes according to the relationships specified by (2) above, i.e. $R = Y + 1.402U$; $G = Y - 0.715U - 0.344V$; $B = Y + 1.770V$, and, as described above, those relationships include an appropriate scaling factor to translate U and V values from a negative-to-positive range to a zero-to-positive range. Accordingly, U and V data bytes provided to the YUV to RGB converter are first unsigned by removing, if present, a "1" bit from the most significant bit position. Since the input U and V numerical values are positive or negative, negative numbers being represented by signed bytes (i.e. by a 1 in the most significant bit), removing the signed bit produces a byte which is the absolute value of the signed byte. For example, the signed byte representing −16 is represented in binary form as 10010000 and the absolute value of the number, being 16, is represented by the byte 00010000. Accordingly, binary 10000000 (i.e. 128) is subtracted from U and V data bytes by adders 110 and 128, respectively to produce the absolute values of those bytes. The output of adder 110, representing the absolute value of U, is multiplied by 1.402 by multiplier 112, added to the Y data byte by adder 114 and the result is limited by limiter 116 to produce the R data byte corresponding to input Y, U and V data bytes. Contemporaneously, the output of adder 128 representing the absolute value of V, is multiplied by 1.770 by multiplier 130 and added to the Y data byte by adder 132 and the result is limited by limiter 134 to produce the B data byte corresponding to input Y, U and V data bytes. Also contemporaneously, the output of adders 110 and 128 are multiplied by 0.715 and 0.344, respectively, by multipliers 118 and 126, respectively, and subtracted from the Y data byte by adders 120 and 122, respectively, the result being limited by limiter 128 to produce the G data byte corresponding to input Y, U and V data bytes.

Referring again to FIG. 5 the resulting R, G and B data bytes produced by YUV-RGB converter 98 (illustrated by FIG. 6 and discussed above) are then converted to corresponding analog signals by digital-to-analog (D/A) converter and amplifier 100. Digital-to-analog conversion in the present embodiment is accomplished by three 8 bit D/A converters, one each for R, G and B data bytes. D/A converter devices are widely available in the marketplace for a variety of operating parameters, such as desired speed. In the present embodiment the output of the D/A converters, being analog signals corresponding to input R, G and B data bytes, are filtered and level shifted using appropriate amplifiers to produce corresponding analog R, G and B signals compatible with the selected RGB video display terminal. D/A conversion 98 produces three analog signals representing red, green and blue colour components corresponding to the pixel addressed by raster address generator 94.

Synchronizing signals 102 are produced in conjunction with raster address generator 94 comprising signal pulses occurring when raster address generator 94 generates addresses corresponding to the beginning and ending of picture lines and the beginning and ending of a new picture (i.e. a new raster of raster addresses).

Figure 7:
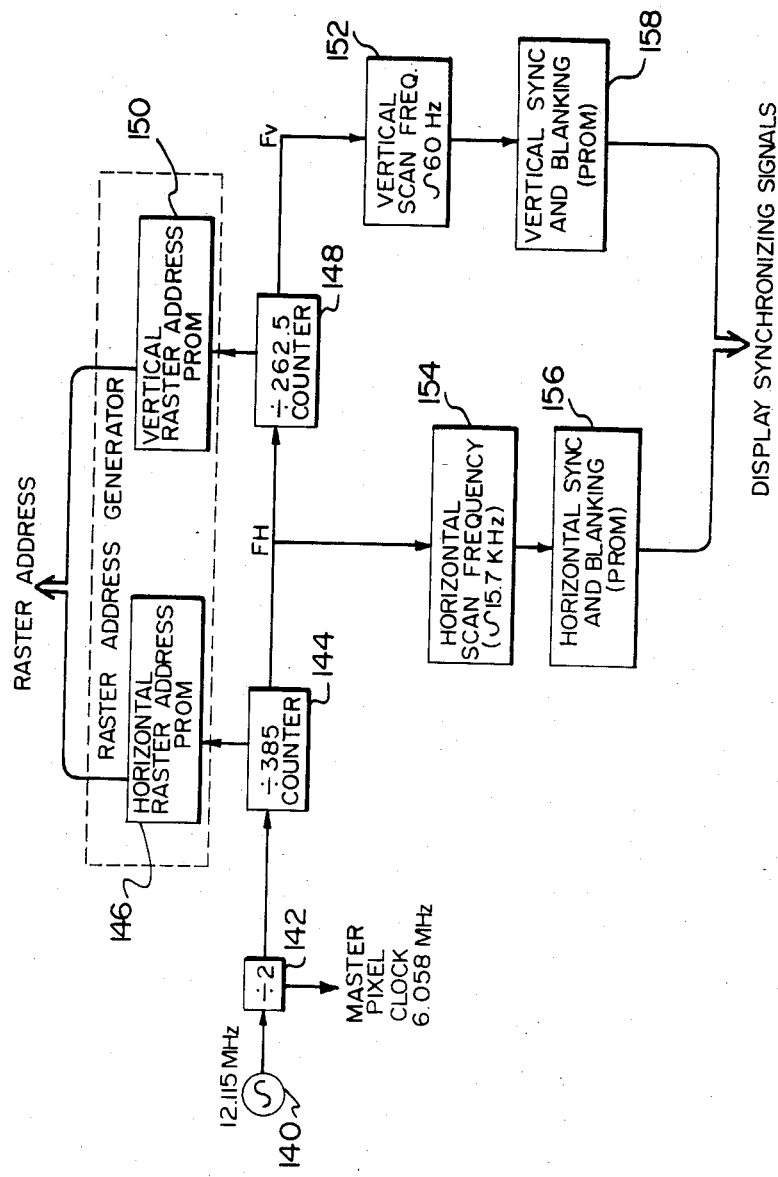
FIG. 7 is a flow chart which illustrates a method of generating video screen raster addresses and synchronizing signals according to the invention.

FIG. 7 illustrates the method of generating raster addresses and synchronizing signals for displaying each horizontal line of a picture sequentially (i.e. as opposed to horizontal interlacing used in broadcast television). If interlacing is desired appropriate addressing and synchronizing means can be readily accomplished in a manner similar to that illustrated by FIG. 7, so that the vertical counting rate is doubled and raster addresses corresponding to every second horizontal line are generated consecutively. Appropriate electron gun "fly-back" synchronizing pulses to effect interlacing etc. would also be necessary.

Referring now to FIG. 7, a 12.115 MHz crystal oscillator 140 produces a sinusoidal signal having an oscillating frequency of 12.115 MHz. This signal is divided by 2 by a divide-by-two counter 142 to produce a master pixel clock signal having a frequency of 6.058 MHz, the pixel clock signal being used by multiplexer 92 of FIG. 5 (described above). The 6.058 MHz signal is counted by a 385-counter 144 used to determine the horizontal address generated by horizontal address generator 146. A counter which counts from 0 to 384 (i.e. 385 counts) repetitively is selected so that the horizontal addressing rate corresponds to the standard North American television horizontal scanning frequency ($F_H$) of approximately 15.7 KHz, each count of 385 of a 6.058 MHz signal occurring at the frequency 15.7 KHz (i.e. $6.058 \times 10^6/385$). Since 385 possible horizontal pixel addresses are provided by counter 144 (i.e. one for each count), raster address PROM 146 is used to identify each count and produce an address from 0 to 255, the selected horizontal resolution of the screen being 256 pixels wide. Accordingly, in the present embodiment, horizontal raster address generator 146 is a PROM programmed in such a manner that it produces the address 0 when the count of counter 144 is 33, the address 1 upon a count of 34, the address binary 10 upon a count of 35 and so on up to a count of 288 when the address 11111111 (i.e. decimal 255) is produced. For counts 0 to 32 and 289 to 384 the address generated by the horizontal raster address generator 146 is not used and could be set to any number, for example, set to 0. During those counts, the electron guns of the display terminal are turned off.

The approximate 15.7 KHz output of counter 144 is divided by 262.5 (i.e. 525÷2) by counter 148 to produce a vertical scanning frequency ($F_V$) of approximately 60 Hz, corresponding to that used in standard North American television (i.e. $15.7 \times 10^3/262.5$ Hz is approximately equal to 60 Hz). The count of counter 148 is used to determine vertical addressing by vertical address generator 150. For example, in the present embodiment vertical address generator 150 is a PROM programmed in such a way that each count results in the production of consecutive row addresses the rows going from a count of 0 to 191 (i.e. since a vertical resolution of 192 rows was selected). The first and/or last counts, being a total of 72½ counts, can be set to any number, for example 0, since they do not correspond to a selected vertical address in the present embodiment, the number of rows selected being only 192. Again, during those counts, the electron guns of the display terminal are turned off. The combined addresses produced by horizontal and vertical address generators 146 and 150, respectively, comprise full raster address information which is used to address the appropriate Y, U and V memory locations to access Y, U and V data stored at those locations corresponding to the addressed raster pixel.

Still referring to FIG. 7 the output of counter 144 (i.e. $F_H$) is used to produce horizontal synchronizing pulses, including blanking pulses and gun "fly-back" pulses. As stated above, in the present embodiment, counts 0 to 32 and 289 to 384 of counter 144 do not correspond to utilized picture area. Accordingly, PROM 156 receives the output of counter 144 and is programmed in such a way that a blanking pulse is produced during those counts to disable the video display guns of the selected RBG terminal (i.e. the red, green and blue electron guns) so that the screen locations corresponding to those counts is not illuminated. Also, at count 384, corresponding to the end of a horizontal line, a fly-back pulse is generated to reset the gun to the beginning of the next horizontal line of the display screen. Similarly, appropriate vertical blanking pulses and a frame reset fly-back pulse are produced before and at the end of vertical counting cycles of counter 148 using an appropriately programmed PROM 158.

Returning to FIG. 5 synchronizing signals 102 and analog R, G and B signals (produced by D/A converter 100) are then transmitted to a compatible RGB video display terminal 104 to display the picture information (represented by the R, G and B analog signals) at the pixel location of the video screen having the address generated by raster address generator 94. As indicated above it is necessary to transform the analog R, G and B signals into appropriate television broadcast form (i.e. appropriate luminance and chrominance analog signals) if a regular television is desired to display the resulting photographic image. Circuitry to accomplish this is well known.

Those skilled in the art will recognize that many of the details of the embodiment of the present invention disclosed above can be modified or substituted by equivalently functioning devices and/or procedures. The examples given are given only for the purpose of illustrating one method of implementing the present invention according to the methods selected by the present inventors. For example well known in the industry is the fact that there are a large number of integrated and discrete circuit devices in the marketplace which can be combined to perform equivalent functions. Accordingly, numerous variations of the present invention may be made without departing from the scope of the invention which is defined in the appended claims.

We claim:

1. In or for use with a video data conversion system for converting a selected one of two digitally constructed data presentations, each associated with the same raster of pixels, into the other of said two digitally constructed data presentations, wherein:
   (i) one of said data presentations is represented by one or more digital data signals, whereby each of three primary colour components of a discrete one of the raster of pixels is represented, said data signals comprising a series of primary colour data packets, each of said data packets defining the relative intensity of its associated primary colour for the pixel to which it relates;
   (ii) the other of said data presentations is represented by one or more digital data signals comprising a series of luminance data packets, a series of first chrominance data packets, and a series of second chrominance data packets;
      each of said luminance data packets defining the luminance, according to a predetermined primary colour relationship, of a discrete one of the raster of pixels;
      each of said chrominance data packets defining a luminance-colour function value for a selected group of a series of groups of said pixels;
      the luminance-colour function values for the first and second chrominance data packets being selected so that the resultant luminance and colour associated with each group of the pixels is substantially defined by the combination of the luminance packets and the first and second chrominance packets for such pixel;
      each said group of pixels comprising a selected number and array of contiguous pixels;
      each of the first chrominance data packets for each said group of pixels representing a luminance-first colour function value that is representative of substantially the average of the individual luminance-first colour function values of the individual pixels in the group;
      each of the second chrominance data packets for each said group of pixels representing a luminance-second colour function value that is representative of substantially the average of the individual luminance-second colour function values of the individual pixels in the group; encoding apparatus for converting the data presentation of paragraph (i) above into the data presentation of paragraph (ii) above comprising:
   (a) receiving means for receiving said signals representing the series of primary colour data packets, said receiving means including communications interface apparatus to permit identification of said signals;
   (b) identification means to identify three primary colour data packets for each pixel of said raster of pixels, each data packet representing a different one of each of three primary colour components of the pixel;
   (c) means to produce a luminance signal representing a series of luminance values for a corresponding series of discrete pixels of said raster of pixels, including multiplication and addition means to sum predetermined proportions of the values of each of said three identified data packets representing each of three primary colour components of the pixel;
   (d) means to produce a first chrominance signal representing substantially the average of the luminance-first colour function value associated with each pixel in a group of pixels of said raster of pixels including first combining means to combine according to a first predetermined relationship the values of luminance signals representing the pixels in said group of pixels and the values of one or more of three selected primary colour components associated with the pixels in said group of pixels, the combination forming said first chrominance signal representative of substantially the average of the luminance-first colour function values corresponding to each pixel in said group of pixels; and
   (e) means to produce a second chrominance signal representing substantially the average luminance-second colour function value associated with each pixel in a group of pixels of said raster of pixels including second combining means to combine according to a second predetermined relationship the values of luminance signals representing the pixels in said group of pixels and the values of one or more of the selected primary colour components associated with the pixels in said group of pixels, said relationship determined so that said first chrominance signal and said second chrominance signal for a group of pixels represent independent colour information, the combination forming said second chrominance signal representative of substantially the average of the luminance-second colour function values corresponding to each pixel in said group of pixels,
      the first and second predetermined relationships being selected so that the first chrominance signal, the second chrominance signal and luminance signal when suitably combined satisfactorily represent the brightness and colour of each group of pixels, the colour being averaged over the group and the brightness being represented on a pixel-by-pixel basis.

2. The apparatus of claim 1 wherein each of said groups of pixels comprises four contiguous pixels in a two-by-two array.

3. The apparatus of claim 2 wherein said identification means includes data processing means.

4. The apparatus of claims 1, 2 or 3 wherein each said combining means includes smoothing means to smooth luminance-first colour function values and luminance-second colour function values for each pixel in said group of pixels, said smoothing means including digital data processing means.

5. In or for use with a video data conversion system for converting a selected one of two digitally constructed data presentations, each associated with the same raster of pixels, into the other of said two digitally constructed data presentations, wherein:

(i) one of said data presentations is represented by one or more digital data signals, whereby each of three primary colour components of a discrete one of the raster of pixels is represented, said data signals comprising a series of primary colour data packets, each of said data packets defining the relative intensity of its associated primary colour for the pixel to which it relates;

(ii) the other of said data presentations is represented by one or more digital data signals comprising a series of luminance data packets, a series of first chrominance data packets, and a series of second chrominance data packets;

each of said luminance data packets defining the luminance, according to a predetermined primary colour relationship, of a discrete one of the raster of pixels;

each of said chrominance data packets defining a luminance-colour function value for a selected group of a series of groups of said pixels;

the luminance-colour function values for the first and second chrominance data packets being selected so that the resultant luminance and colour associated with each group of the pixels is substantially defined by the combination of the luminance packets and the first and second chrominance packets for such pixel;

each said group of pixels comprising a selected number and array of contiguous pixels;

each of the first chrominance data packets for each said group of pixels representing a luminance-first colour function value that is representative of substantially the average of the individual luminance-first colour function values of the individual pixels in the group;

each of the second chrominance data packets for each said group of pixels representing a luminance-second colour function value that is representative of substantially the average of the individual luminance-second colour function values of the individual pixels in the group; decoding apparatus for converting the data presentation of paragraph (ii) above into the data presentation of paragraph (i) above comprising:

(a) receiving means for receiving said signals comprising a series of luminance data packets, a series of first chrominance data packets, and a series of second chrominance data packets, including communication interface apparatus to permit identification of said signals;

(b) identification means to identify a luminance data packet, a first chrominance data packet and a second chrominance data packet for each pixel of said raster of pixels, said data packets representing picture information for the pixel;

(c) means to generate for each discrete pixel position on said raster of pixels a raster address for the pixel, said addressed pixel being associated with said identified luminance and first and second chrominance data packets representing picture information for the pixel;

(d) accessing means to access said identified luminance and first and second chrominance data packets corresponding to said pixel whose raster position corresponds to said generated raster address;

(e) combining means to produce, for each said pixel, three primary colour signals comprising three data packets, using a predetermined relationship between said accessed luminance and first and second chrominance values, said combining means including multiplication and addition means.

6. The apparatus of claim 5, including storing means to store said received data packets, said stored data packets capable of being accessed by said accessing means, and said accessing means including retrieval means to retrieve said stored data packets.

7. The apparatus of claim 6, including conversion means to convert said three primary colour data packets for each pixel into three analog signals, each of said signals representing one of each of three primary colour components associated with the addressed pixel.

8. The apparatus of claim 5, wherein each of said groups of pixels comprises four pixels in a two-by-two array.

9. The apparatus of claim 7, wherein each of said groups of pixels comprises four pixels in a two-by-two array.

10. The apparatus of claim 9, wherein said storing means includes data processing means capable of addressing said stored data packets said stored data packets being stored in random access memory.

11. The apparatus of claim 10, wherein said retrieval means includes time-sharing means to permit access to said random access memory storing said data packets, whereby the timing of said access is capable of being asynchronous with the timing of addressing said stored data packets by said data processing means.

12. A video colour photographic image data conversion method wherein the number of data packets transmitted is reduced, including the following steps:

(a) (i) converting digital data signals consisting of a series of primary colour data packets representing picture information for a raster of pixels each pixel of said raster represented by three data packets each packet representing a different one of three primary colour components of said pixel
into
(ii) digital data signals consisting of a series of luminance and first and second chrominance data packets each of said first and second chrominance packets representing substantially the average of first and second chrominance information for pixels of a group of contiguous pixels, whereby each pixel is represented by a data packet representing luminance information on a pixel-by-pixel basis and each pixel of a group of contiguous pixels is represented by chrominance information which is substantially the average of the chrominance information for said pixels of said group; and (b) transmitting said luminance and first and second chrominance data packets;

(c) receiving said luminance and first and second chrominance data packets; and (d) converting said received luminance and first and second chrominance data packets into digital data signals consisting of a series of primary colour data packets, three of said data packets representing picture information for one pixel, each one of said three data packets representing one of each of three primary colour components of the pixel whereby luminance information for each pixel of said raster of pixels is represented on a pixel-by-pixel basis and chrominance information for each pixel in a group of contiguous pixels of said raster of pixels is represented on a group-pixel basis, the chrominance information for the pixels in said group having been substantially averaged prior to said transmission of said data packets;

wherein the values of said first and second chrominance packets are determined according to first and second predetermined relationships, respectively, between luminance and primary colour values, said relationships being defined so that together the luminance and first and second chrominance packets for a pixel substantially define the luminance and colour information for the pixel.

13. The method of claim 10 where said group of contiguous pixels comprises four pixels in a two-by-two array.

14. A video data conversion method for converting a first digitally constructed data presentation, into a second digitally constructed data presentation, each associated with the same raster of pixels, wherein:

(i) the first said data presentation is represented by one or more digital data signals, whereby each of three primary colour components of a discrete one of the raster of pixels is represented, said data signals comprising a series of primary colour data packets, each of said data packets defining the relative intensity of its associated primary colour for the pixel to which it relates;

(ii) the second said data presentation is represented by one or more digital data signals comprising a series of luminance data packets, a series of first chrominance data packets, and a series of second chrominance data packets;

each of said luminance data packets defining the luminance, according to a predetermined primary colour relationship, of a discrete one of the raster of pixels;

each of said chrominance data packets defining a luminance-colour function value for a selected group of a series of groups of said pixels;

the luminance-colour function values for the first and second chrominance data packets being selected so that the resultant luminance and colour associated with each group of the pixels is substantially defined by the combination of the luminance packets and the first and second chrominance packets for such pixel;

each said group of pixels comprising a selected number and array of contiguous pixels;

each of the first chrominance data packets for each said group of pixels representing a luminance-first colour function value that is representative of substantially the average of the individual luminance-first colour function values of the individual pixels in the group;

each of the second chrominance data packets for each said group of pixels representing a luminance-second colour function value that is representative of substantially the average of the individual luminance-second colour function values of the individual pixels in the group; including the following steps:

(a) receiving and identifying said signals representing the series of primary colour data packets;

(b) identifying three primary colour data packets for each pixel of said raster of pixels, each data packet representing a different one of each of three primary colour components of the pixel;

(c) producing a luminance signal representing a series of luminance values for a corresponding series of discrete pixels of said raster of pixels;

(d) producing a first chrominance signal representing substantially the average of the luminance-first colour function value associated with each pixel in a group of pixels of said raster of pixels including combining according to a first predetermined relationship the values of luminance signals representing the pixels in said group of pixels and the values of one or more of three selected primary colour components associated with the pixels in said group of pixels, the combination forming said first chrominance signal representative of substantially the average of the luminance-first colour function values corresponding to each pixel in said group of pixels; and (e) producing a second chrominance signal representing substantially the average luminance-second colour function value associated with each pixel in a group of pixels of said raster of pixels including combining according to a second predetermined relationship the values of luminance signals representing the pixels in said group of pixels and the values of one or more of the selected primary colour components associated with the pixels in said group of pixels, said relationship determined so that said first chrominance signal and said second chrominance signal for a group of pixels represent independent colour information, the combination forming said second chrominance signal representative of substantially the average of the luminance-second colour function values corresponding to each pixel in said group of pixels, whereby the first and second predetermined relationships are selected so that the first chrominance signal, the second chrominance signal and luminance signal when suitably combined satisfactorily represent the brightness and colour of each group of pixels, the colour being averaged over the group and the brightness being represented on a pixel-by-pixel basis.

15. The method of claim 14 wherein each of said groups of pixels comprises four contiguous pixels in a two-by-two array.

16. A video data conversion method for converting a first digitally constructed data presentation, into a second digitally constructed data presentation, each associated with the same raster of pixels, wherein:

(i) the first said data presentation is represented by one or more digital data signals comprising a series of luminance data packets, a series of first chrominance data packets, and a series of second chrominance data packets;

(ii) the second said data presentation is represented by one or more digital data signals, whereby each of three primary colour components of a discrete one of the raster of pixels is represented, said data signals comprising a series of primary colour data packets, each of said data packets defining the relative intensity of its associated primary colour for the pixel to which it relates;

each of said luminance data packets defining the luminance, according to a predetermined primary colour relationship, of a discrete one of the raster of pixels;

each of said chrominance data packets defining a luminance-colour function value for a selected group of a series of groups of said pixels;

the luminance-colour function values for the first and second chrominance data packets being selected so that the resultant luminance and colour associated with each group of the pixels is substantially defined by the combination of the luminance packets and the first and second chrominance packets for such pixel;

each said group of pixels comprising a selected number and array of contiguous pixels;

each of the first chrominance data packets for each said group of pixels representing a luminance-first colour function value that is representative of substantially the average of the individual luminance-first colour function values of the individual pixels in the group;

each of the second chrominance data packets for each said group of pixels representing a luminance-second colour function value that is representative of substantially the average of the individual luminance-second colour function values of the individual pixels in the group; including the following steps:

(a) receiving and identifying said signals comprising a series of luminance data packets, a series of first chrominance data packets, and a series of second chrominance data packets;

(b) identifying a luminance data packet, a first chrominance data packet and a second chrominance data packet for each pixel of said raster of pixels, said data packets representing picture information for the pixel;

(c) generating for each discrete pixel position on said raster of pixels a raster address for the pixel, said addressed pixel being associated with said identified luminance and first and second chrominance data packets representing picture information for the pixel;

(d) accessing said identified luminance and first and second chrominance data packets corresponding to said pixel whose raster position corresponds to said generated raster address;

(e) producing, for each said pixel, three primary colour signals comprising three data packets, using a predetermined relationship between said accessed luminance and first and second chrominance values.

* * * * *